United States Patent
Ikezawa

(10) Patent No.: US 12,205,153 B2
(45) Date of Patent: Jan. 21, 2025

(54) SALES SUPPORT SYSTEM, METHOD, AND RECORDING MEDIUM

(71) Applicant: NEC Corporation, Tokyo (JP)

(72) Inventor: Rumi Ikezawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/273,159

(22) PCT Filed: Jun. 24, 2021

(86) PCT No.: PCT/JP2021/023946
§ 371 (c)(1),
(2) Date: Jul. 19, 2023

(87) PCT Pub. No.: WO2022/269855
PCT Pub. Date: Dec. 29, 2022

(65) Prior Publication Data
US 2024/0152978 A1    May 9, 2024

(51) Int. Cl.
*G06Q 30/0283* (2023.01)
*G06Q 20/20* (2012.01)
*G06Q 30/0601* (2023.01)

(52) U.S. Cl.
CPC ....... *G06Q 30/0283* (2013.01); *G06Q 20/208* (2013.01); *G06Q 30/0633* (2013.01); *G06Q 30/0641* (2013.01)

(58) Field of Classification Search
CPC ............. G06Q 20/208; G06Q 30/0633; G06Q 30/0283; G06Q 30/0641
(Continued)

(56) References Cited

U.S. PATENT DOCUMENTS 7,853,473 B2 * 12/2010 Davis ................. G06Q 30/0601
705/400
8,239,276 B2 * 8/2012 Lin ........................ G06Q 30/02
705/26.1
(Continued)

FOREIGN PATENT DOCUMENTS

EP         4113417 A1 *  1/2023  .......... G06K 7/1413
JP      2016-053794 A     4/2016
(Continued)

OTHER PUBLICATIONS

A. Gooding et al., "TOSNOS: To Online Shop, or Not-to Online Shop - Enabling Combined Improvements," 2020 IEEE International Conference on Pervasive Computing and Communications Workshops (PerCom Workshops), Austin, TX, USA, 2020, pp. 1-3. (Year: 2020).*

(Continued)

*Primary Examiner* — Jeff Zimmerman
*Assistant Examiner* — Hunter A Molnar

(57) ABSTRACT

A sales support system according to an aspect of the present disclosure includes: at least one memory configured to store instructions; and at least one processor configured to execute the instructions to: generate a purchase product list including a product registered using a portable terminal through an operation of a customer and a price based on a set price referred to for registration of the product; and update a price of a registered product included in the purchase product list to a new set price when an execution condition of a price updating process is satisfied.

10 Claims, 15 Drawing Sheets

(58) Field of Classification Search
USPC .......................................................... 705/400
See application file for complete search history.

(56) References Cited

U.S. PATENT DOCUMENTS

| | | | |
|---|---|---|---|
| 2006/0113383 A1* | 6/2006 | Scott | G06Q 30/02 |
| | | | 235/383 |
| 2007/0051801 A1* | 3/2007 | Garver | G06Q 20/202 |
| | | | 235/383 |
| 2008/0243626 A1 | 10/2008 | Stawar et al. | |
| 2009/0144175 A1* | 6/2009 | Penaflor | G06Q 10/043 |
| | | | 705/26.1 |
| 2010/0262554 A1* | 10/2010 | Elliott | H04W 4/024 |
| | | | 345/173 |
| 2013/0048723 A1 | 2/2013 | King | |
| 2013/0339115 A1* | 12/2013 | Soldate | G06Q 30/06 |
| | | | 705/14.1 |
| 2019/0139121 A1 | 5/2019 | Broome | |
| 2020/0160422 A1 | 5/2020 | Schubert et al. | |
| 2022/0122116 A1 | 4/2022 | Ikezawa | |

FOREIGN PATENT DOCUMENTS

| | | |
|---|---|---|
| JP | 2020-042459 A | 3/2020 |
| JP | 2021-012627 A | 2/2021 |
| KR | 10-2020-0069433 A | 6/2020 |
| KR | 10-2020-0070805 A | 6/2020 |
| WO | 2017/178843 A1 | 10/2017 |
| WO | 2020/174881 A1 | 9/2020 |

OTHER PUBLICATIONS

International Search Report for PCT Application No. PCT/JP2021/023946, mailed on Sep. 28, 2021.
English translation of Written opinion for PCT Application No. PCT/JP2021/023946, mailed on Sep. 28, 2021.
JP Office Action for JP Application No. 2023-529364, mailed on Aug. 27, 2024 with English Translation.
JP Office Action for JP Application No. 2023-529364, mailed on Dec. 3, 2024 with English Translation.

* cited by examiner

PRODUCT DATABASE AT 14:34

| PRODUCT ID | PRODUCT NAME | PRICE |
|---|---|---|
| ID1 | ZOO BISCUIT | 252 YEN |
| ... | ... | ... |

PRODUCT DATABASE AT 15:00

| PRODUCT ID | PRODUCT NAME | PRICE |
|---|---|---|
| ID1 | ZOO BISCUIT | 240 YEN |
| ... | ... | ... |

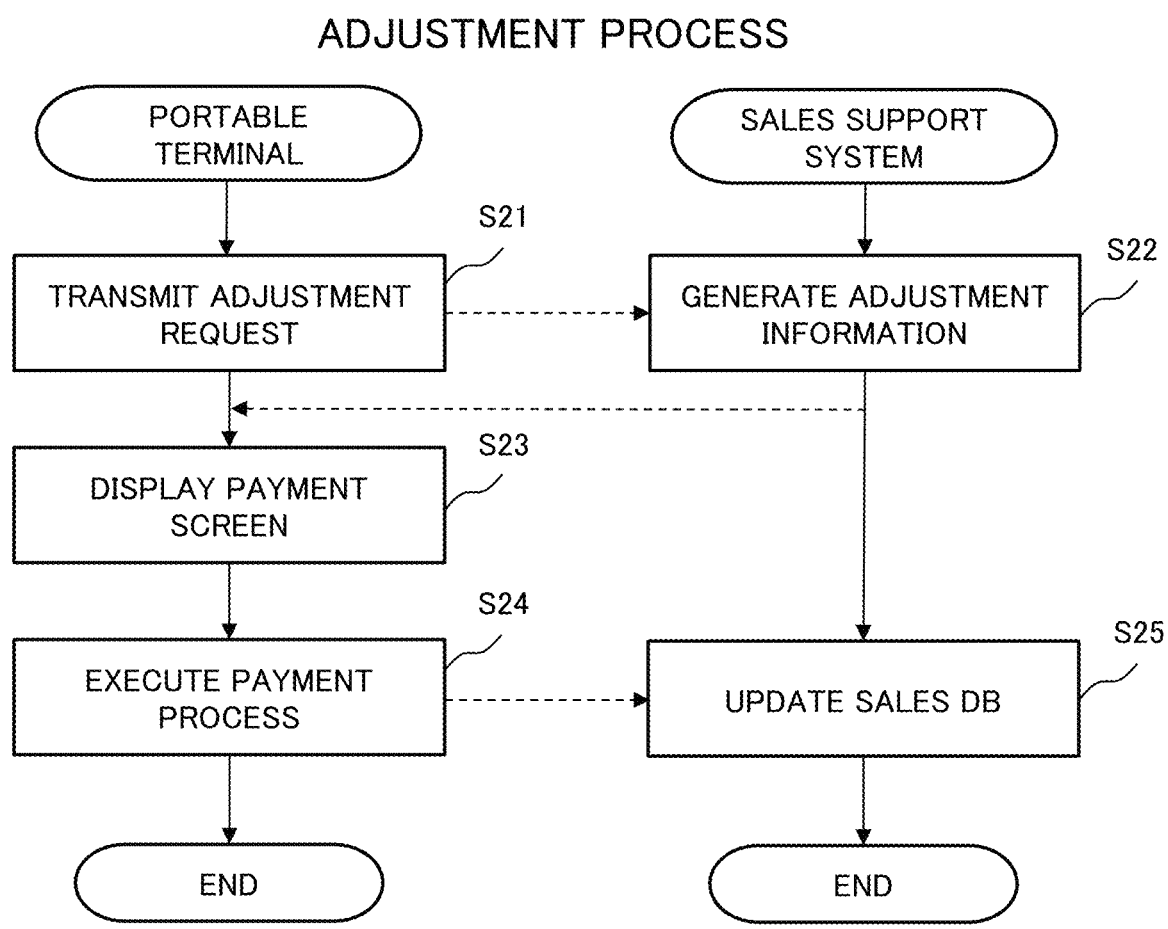

SALES SUPPORT SYSTEM, METHOD, AND RECORDING MEDIUM

This application is a National Stage Entry of PCT/JP2021/023946 filed on Jun. 24, 2021, the contents of all of which are incorporated herein by reference, in their entirety.

TECHNICAL FIELD

The present disclosure relates to a sales support system and the like.

BACKGROUND ART

Product sales systems in which customers read barcodes of products to register the products using portable terminals such as smartphones owned by the customers in stores are known. Such a system is called, for example, a self-scan shopping system. For example, PTL 1 discloses a self-scan shopping system that displays a selling price on a mobile terminal of a customer when the selling price is changed according to a predetermined condition such as set selling. PTL 1 discloses, for example, a set discount for a combination of specific products and a total amount discount that occurs when the total amount of purchased products is equal to or more than a predetermined amount of money.

CITATION LIST

Patent Literature

PTL 1: WO 2020/174881 A1

SUMMARY OF INVENTION

Technical Problem

In an operation of a store, a set price of a product is changed during the operation of the store in some cases. In a self-scan shopping system, a price at a predetermined time point is referred to for a product registered using a mobile terminal. When the set price is changed after the registration, it is desirable to reflect the change in the price in the price of the registered product.

In PTL 1, a set price of a product changing during shopping of a customer is not taken into consideration.

An object of the present disclosure is to provide a sales support system and the like capable of updating a price of a registered product registered using a portable terminal through an operation of a customer when a set price of the product is changed.

Solution to Problem

According to the present disclosure, a sales support system includes a list generation means that generates a purchase product list including a product registered using a portable terminal through an operation of a customer and a price based on a set price referred to for registration of the product, and an updating means that updates a price of a registered product included in the purchase product list to a new set price when an execution condition of a price updating process is satisfied.

According to the present disclosure, a sales support method includes generating a purchase product list including a product registered using a portable terminal through an operation of a customer and a price based on a set price referred to for registration of the product, and updating a price of a registered product included in the purchase product list to a new set price when an execution condition of a price updating process is satisfied.

According to the present disclosure, a program causes a computer to execute a process of generating a purchase product list including a product registered using a portable terminal through an operation of a customer and a price based on a set price referred to for registration of the product, and a process of updating a price of a registered product included in the purchase product list to a new set price when an execution condition of a price updating process is satisfied.

Advantageous Effects of Invention

According to the present disclosure, it is possible to provide a sales support system and the like capable of updating a price of a registered product registered using a portable terminal through an operation of a customer when a price of a product is changed.

BRIEF DESCRIPTION OF DRAWINGS

FIG. 9A is a flowchart illustrating an example of an adjustment process.

EXAMPLE EMBODIMENT

Hereinafter, example embodiments of a sales support system, a method, a program, and a recording medium that non-transiently records the program according to the present disclosure will be described in detail with reference to the drawings. The present example embodiments do not limit the disclosed technology.

First Example Embodiment

Figure 1:
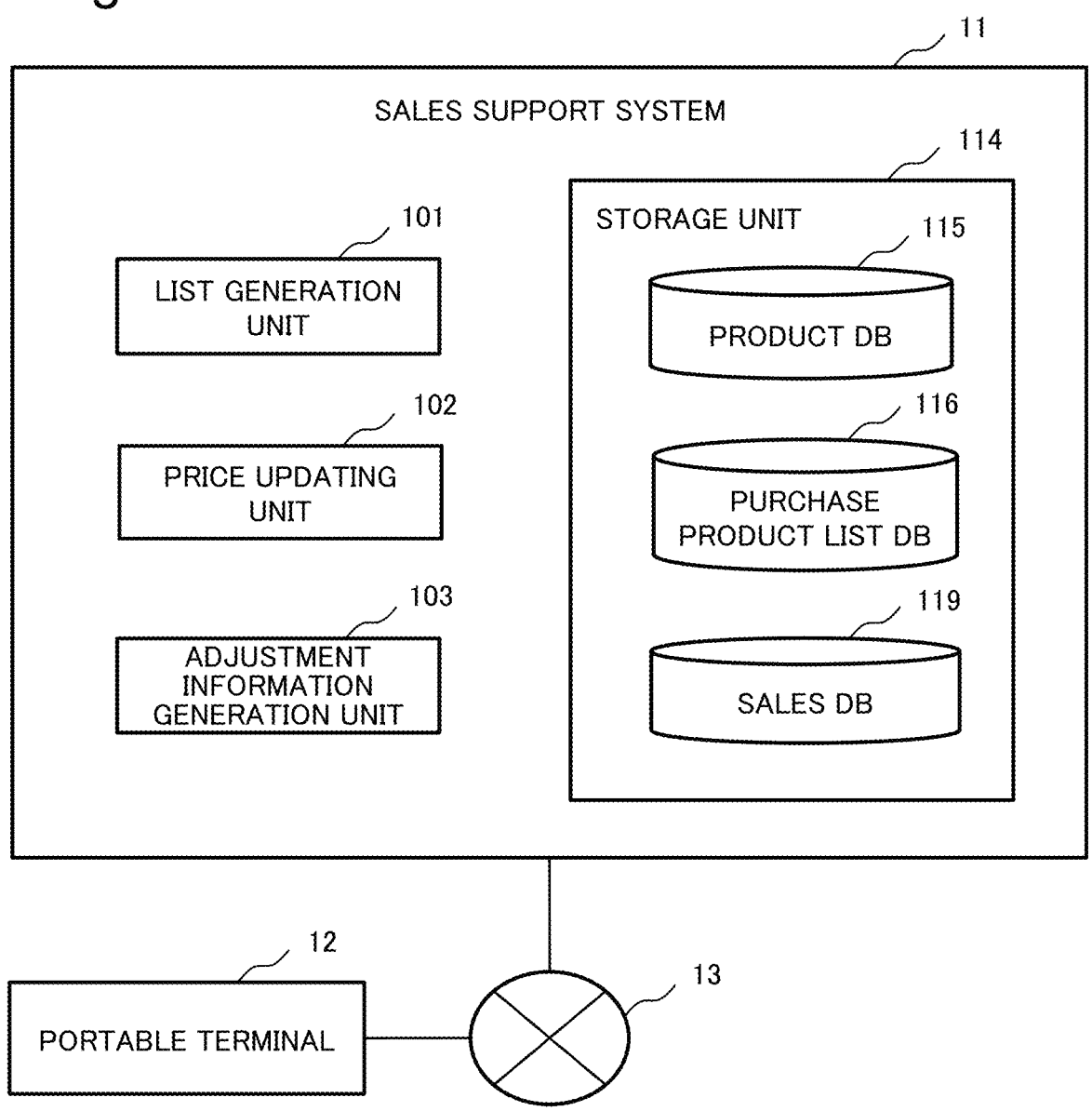
FIG. 1 is a block diagram illustrating a configuration of a sales support system 11 according to a first example embodiment.

FIG. 1 is a block diagram illustrating a configuration of a sales support system 11 according to a first example embodiment. For example, the sales support system 11 may be connected to a portable terminal 12 via a communication network 13.

A customer acquires a product from a shelf or the like in a store, and registers the product using the portable terminal 12. That is, the customer performs self-scan shopping using the portable terminal 12.

The sales support system 11 is a server that manages various types of sales information such as a price, an inventory status, and sales information of a store related to a product that is sold in the store. The sales support system 11 may collectively manage sales information of a plurality of stores. Alternatively, the sales support system 11 may be located at for each store. The sales support system 11 may manage sales information of one store.

The sales support system 11 according to the first example embodiment includes a list generation unit 101, a price updating unit 102, an adjustment information generation unit 103, and a storage unit 114. The storage unit 114 includes a product database (DB) 115, a purchase product list DB 116, and a sales DB 119. The list generation unit 101, the price updating unit 102, and the adjustment information generation unit 103 are examples of a list generation unit, an updating unit, and an adjustment information generation unit, respectively.

The portable terminal 12 is a terminal used by a customer. The portable terminal 12 is, for example, a portable terminal such as a smartphone or a tablet. The type of portable terminal 12 is not particularly limited. The portable terminal 12 may be owned by a customer or may be lent at a store. The portable terminal 12 may be mounted on a shopping basket or a shopping cart or may be integrated with the shopping basket or the shopping cart. A device that has functions of the portable terminal 12 is also referred to as a mobile terminal, a movable terminal, or a moving object. The moving object includes a robot. The moving object may be movable manually or automatically by including, for example, a movable portion such as a tire and a drive device such as a motor.

The list generation unit 101 generates a purchase product list related to a product registered using the portable terminal 12. The purchase product list includes at least a product registered using the portable terminal 12 through an operation of the customer and a price based on a set price referred to in registration of the product.

Specifically, for example, the list generation unit 101 generates a purchase product list in which information for identifying a customer, product information of a product that the customer is planning to purchase, and a purchase quantity are associated with each other. The list generation unit 101 stores the generated purchase product list in the purchase product list DB 116. A product included in the purchase product list and planned to be purchased by the customer is also referred to as a registered product.

The purchase product list is uniquely identified in accordance with the information for identifying a customer. The information for identifying the customer is, for example, a customer identifier (ID) for uniquely identifying a customer. For example, when a customer starts registering a product using the portable terminal 12, the list generation unit 101 assigns a customer ID to the customer. When the process from start of a store entrance process or start of a registration process to end of adjustment is defined as one transaction, the customer ID may be assigned for each transaction.

The product information included in the purchase product list includes, for example, information such as a product name or a product ID with which a product can be identified. The product information of the purchase product list may include a price of the product obtained with reference to the product DB 115 as an example of the price based on the set price referred to in the registration of the product.

The list generation unit 101 generates a purchase product list based on a registration request from the portable terminal 12. Specifically, the list generation unit 101 adds or deletes a product included in the purchase product list based on the product information included in the registration request. That is, the product which the customer plans to purchase is registered using the portable terminal 12 through an operation of the customer.

The list generation unit 101 may transmit the purchase product list in which the items are registered to the portable terminal 12. When the purchase product list is transmitted, for example, the purchase product list is displayed on the portable terminal 12, in such a way that the user can check the purchase product list.

The price stored in the product DB 115 may be changed during customer shopping. At least a case where the price is changed by the store manager or the sales support system 11 during business hours and a case where a time schedule is set in advance to the price stored in the product DB 115 are assumed as changes in the price, but the present disclosure is not limited thereto.

For example, in order for the store manager to adjust a sales volume and a profit rate of the product, the price may be changed based on the input of the store manager. The sales support system 11 may change the price based on, for example, a date, a day of week, a time, a target sales quantity, an inventory status, a best-before date of the product, an expiration date, and the like. When the time schedule is set, the price for each time period is stored for the product.

When an execution condition is satisfied, the price updating unit 102 performs a price updating process of updating the price of the registered product included in the purchase product list to a new set price. The execution condition of the price updating process is not particularly limited, but may be, for example, that one or more products are registered using the portable terminal 12. That is, the price updating unit 102 may perform the price updating process whenever a predetermined number of products are newly registered. The price updating process will be described below.

The price updating unit 102 may determine whether the execution condition is satisfied. Specifically, for example, when the execution condition is registration of one new product using the portable terminal 12, the price updating unit 102 determines whether the number of products in the purchase product list has increased from the previous determination. That is, in this case, the price updating unit 102 determines that the execution condition is satisfied when the number of products in the purchase product list increases from the previous determination.

Alternatively, instead of determining the execution condition, the price updating unit 102 may receive a notification indicating that the execution condition is satisfied. Specifically, when the execution condition is registration of one new product using the portable terminal 12, the price updating unit 102 may receive a notification indicating that a product has been added from the list generation unit 101. The price updating unit 102 may receive a notification indicating that the execution condition is satisfied other than from the list generation unit 101.

As an example of the price updating process, when a predetermined execution condition is satisfied, the price updating unit 102 refers to the set price and updates the price included in the purchase product list based on the set price.

As an example of the price updating process, the price updating unit 102 may determine whether the set price has been changed when the predetermined execution condition is satisfied, and may update the price included in the purchase product list when the price has been changed. In order to determine whether the set price has been changed, the price updating unit 102 may determine whether the price of the product included in the purchase product list matches a price stored in the product DB 115. Alternatively, the price updating unit 102 may determine whether the product DB 115 has been updated after the list generation unit 101 generates the list. Alternatively, the price updating unit 102 may determine whether the product DB 115 has been updated after a product is added to the list. The price updating unit 102 may determine whether the price has been changed by determining whether the product DB 115 has been updated since the previous determination.

When the price has been changed, the price updating unit 102 updates the price of the registered product included in the purchase product list to a new price. Specifically, the price updating unit 102 updates the price of the product in the purchase product list stored in the purchase product list DB 116 to a new set price indicated by the product DB 115. In the present example embodiment, the price updating unit 102 may update the price to a lower price or a higher price. The price updating unit 102 may update the price with reference to the set price even when the set price has not changed.

The price updating unit 102 may transmit the purchase product list in which the price of the registered product has been updated to the portable terminal 12. The price updating unit 102 may cause the portable terminal 12 to display a notification indicating that the price has been updated.

The adjustment information generation unit 103 generates adjustment information used for adjustment of the price based on the purchase product list. The adjustment information includes at least a total payment amount of the registered products included in the purchase product list. The adjustment information may further include a total quantity of registered products, a product name and a price of each registered product, and the like.

When the price updating unit 102 updates the price, the adjustment information generation unit 103 generates the adjustment information based on the updated purchase product list. The adjustment information generation unit 103 may transmit the adjustment information to the portable terminal 12 for adjustment or may transmit the adjustment information to an adjustment device installed in the store.

For example, the adjustment information generation unit 103 updates the sales DB 119 in accordance with the content of the adjustment.

The storage unit 114 stores, for example, data used for a process of each unit of the sales support system 11.

The product DB 115 stores product information of products handled in a store or a chain store including a store. Specifically, the product DB 115 stores product information, for example, for each product. The product information stored in the product DB 115 includes a product ID, a product name, and a price of a product. The product ID is, for example, a product code (hereinafter referred to as a product code). The product code is, for example, a Japanese Article Number (JAN) code, a European Article Number (EAN) code, or a Universal Product Code (UPC). The product ID may be a product name. The price of the product may be a tax-excluded price of the product or a tax-included price.

The product DB 115 may further include, for example, information such as classification of a product, a feature of the product, and an inventory status of a product. The classification of the products is not particularly limited. For example, the classification of products may be broadly classified into, for example, food, stationery, and the like. The classification of the products may be classification of confectionery, meats, vegetables, or the like. The features of the products are not particularly limited. The features of the products may be a best-before date, a use-by date, a manufacturer name, a vendor name, or the like. The inventory status of the products may be an inventory quantity of the products or the like.

The product information may include information for identifying a product in addition to a product ID. For example, the product information may include image data of a product, or information of a feature amount obtained from the image data of the product.

The product DB 115 may include some or all of the above-described information regarding the product. The product DB 115 may include information other than the above-described information regarding the product.

The purchase product list DB 116 stores, for each customer, the latest purchase product list for which adjustment has not been completed. The member ID may be used as a customer ID with which the purchase product list is uniquely identified. The member ID is an ID with which a member registered in a service of a store is uniquely identified. Alternatively, the purchase product list DB 116 may store the customer ID and the member ID in association.

The purchase product list DB 116 may include a store entrance time which is a time when the customer executes the store entrance process. The store entrance process is, for example, a process of starting the above-described registration process. The purchase product list DB 116 may include a time at which a registration request of each product is received.

A price of the product is obtained from the product DB 115 based on the product ID of the purchase product list. The price indicated by the product DB 115 may be registered initially in the purchase product list when the product is registered. Alternatively, the price of the product DB 115 associated to a time at which the store entrance process is executed may be registered initially. The purchase product list DB 116 may store the tax-excluded price of the product calculated based on the tax-excluded price of the product acquired from the product DB 115. The price initially registered in the purchase product list can be updated by the price updating unit 102.

The purchase product list DB 116 may include all or part of the above-described information regarding the purchase product list. The purchase product list DB 116 may include information other than the above-described information regarding the purchase product list.

The sales DB 119 stores, for example, information regarding store sales for each store. For example, the sales DB 119 may manage information in accordance with each adjustment for each store. The sales DB 119 stores, for example, information of a store ID, an ID of the portable terminal 12 that has registered a product, a member ID of a user, a product ID of a purchased product, a purchase quantity, a selling price, and a purchase date and time in association. The store ID is an identifier for uniquely identifying the store.

The sales DB 119 may include all or part of the above-described information regarding sales. The sales DB 119 may include information other than the above-described information regarding sales.

For example, the sales DB 119 and the product DB 115 are associated with each other with a product ID. For example, the sales support system 11 may update the inventory status of the product DB 115 based on information regarding a purchase quantity registered in the sales DB 119.

The sales support system 11 may not include some of the functional units such as the adjustment information generation unit 103. The sales support system may include a functional unit (not illustrated).

A device configuration of sales support system 11 is not particularly limited. The sales support system 11 may be implemented by one device or may be implemented by different devices for each function or database (DB). Some functions of the sales support system 11 may be implemented by the portable terminal 12. For example, at least one of the list generation unit 101, the price updating unit 102, and the adjustment information generation unit 103 may be implemented by the portable terminal 12.

The sales support system 11 may be configured in a combination of servers such as a backbone server, a database server, a price look up (PLU) server, a point of sales (POS) server, and an application server. For example, the PLU server and the application server may be used to implement the list generation unit 101. The server that manages the sales DB 119 may function as, for example, a database server. The server that displays a screen on the portable terminal 12 may be at least one of an application server, a POS server, or a backbone server. Each server passes information to be used for the assigned process via, for example, the communication network 13 or the like. However, names of the servers included in the sales support system 11 are not limited thereto. The sales support system 11 may not include some of these servers.

Figure 2:
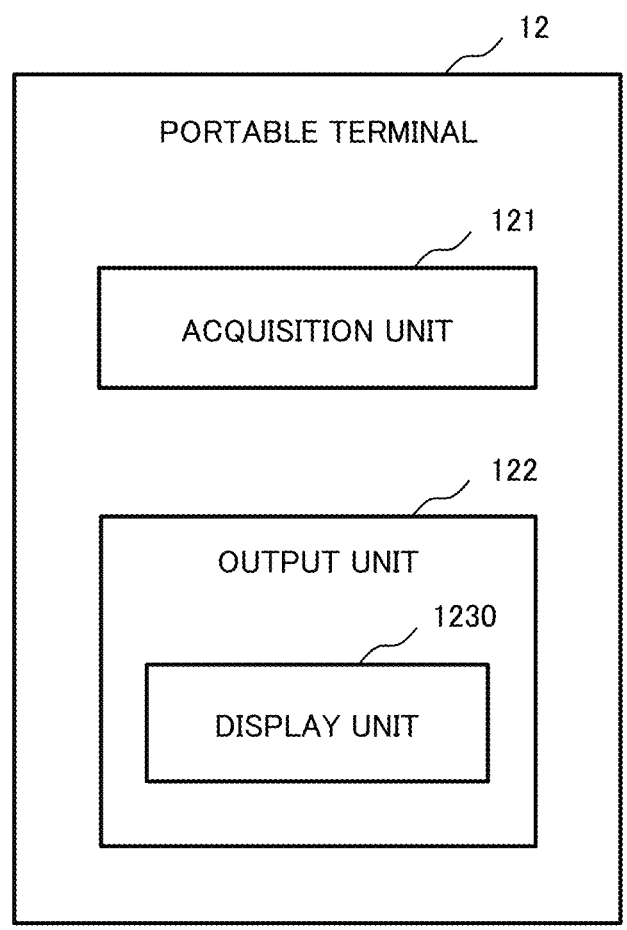
FIG. 2 is a block diagram illustrating a configuration example of a portable terminal 12.

FIG. 2 is a block diagram illustrating a configuration example of the portable terminal 12. The portable terminal 12 includes an acquisition unit 121 and an output unit 122. The output unit 122 includes a display unit 1230. A storage unit (not illustrated) of the portable terminal 12 may store a customer ID and an identifier for identifying the portable terminal 12.

The acquisition unit 121 acquires a product ID of a product selected by a customer. The output unit 122 transmits a registration request including the product ID acquired by acquisition unit 121 to the sales support system 11, and causes the sales support system 11 to register the product as a purchased product.

The acquisition unit 121 acquires the product ID of the purchased product by reading a product code attached to the product or the like via, for example, an imaging device (not illustrated). The imaging device is not particularly limited and is, for example, a camera included in the portable terminal 12. The product code is the above-described JAN code or the like. The imaging device reads an encoded product code such as a barcode or a 2-dimensional code. For example, the acquisition unit 121 may acquire the product ID by identifying the product using the image recognition function from an image of the product captured by the imaging device.

The acquisition unit 121 may acquire the product ID by reading the image of the product or an image of a picture of the product captured in advance via the imaging device. These images may contain a product code.

The acquisition unit 121 may acquire the product ID by reading a tag to which a radio frequency identifier (RFID) is attached via a reading device. When the RFID is used, the reading device is an RFID reader.

The acquisition unit 121 may acquire the product ID by receiving a selection of a product from a result of product searching. For example, a method of searching for the product is not particularly limited. The product may be searched for with characters. The product may be searched for with an image. For example, the acquisition unit 121 may acquire the product ID by receiving a selection of a product to be purchased from the displayed image of the product.

The acquisition unit 121 may acquire the product ID by receiving an input of a number such as a JAN code via an input device (not illustrated). Examples of the input device include a touch panel display and a keyboard with which numbers and characters can be input.

The output unit 122 transmits the product ID acquired by acquisition unit 121 to the sales support system 11. At this time, the output unit 122 also transmits the customer ID or the identifier for identifying the portable terminal 12 to the sales support system 11. The portable terminal 12 may receive a name and a price of the product related to the transmitted product ID from the sales support system 11. At this time, the display unit 1230 displays the name and price of the product.

The portable terminal 12 receives the purchase product list from the sales support system 11. The display unit 1230 displays the purchase product list received from the sales support system 11. The display unit 1230 may display a notification indicating that the price of the registered product has been updated.

Hereinafter, exemplary operations of the sales support system 11 and the portable terminal 12 according to the first example embodiment will be described with reference to the drawings.

1. Product Registration Process

Figure 3:
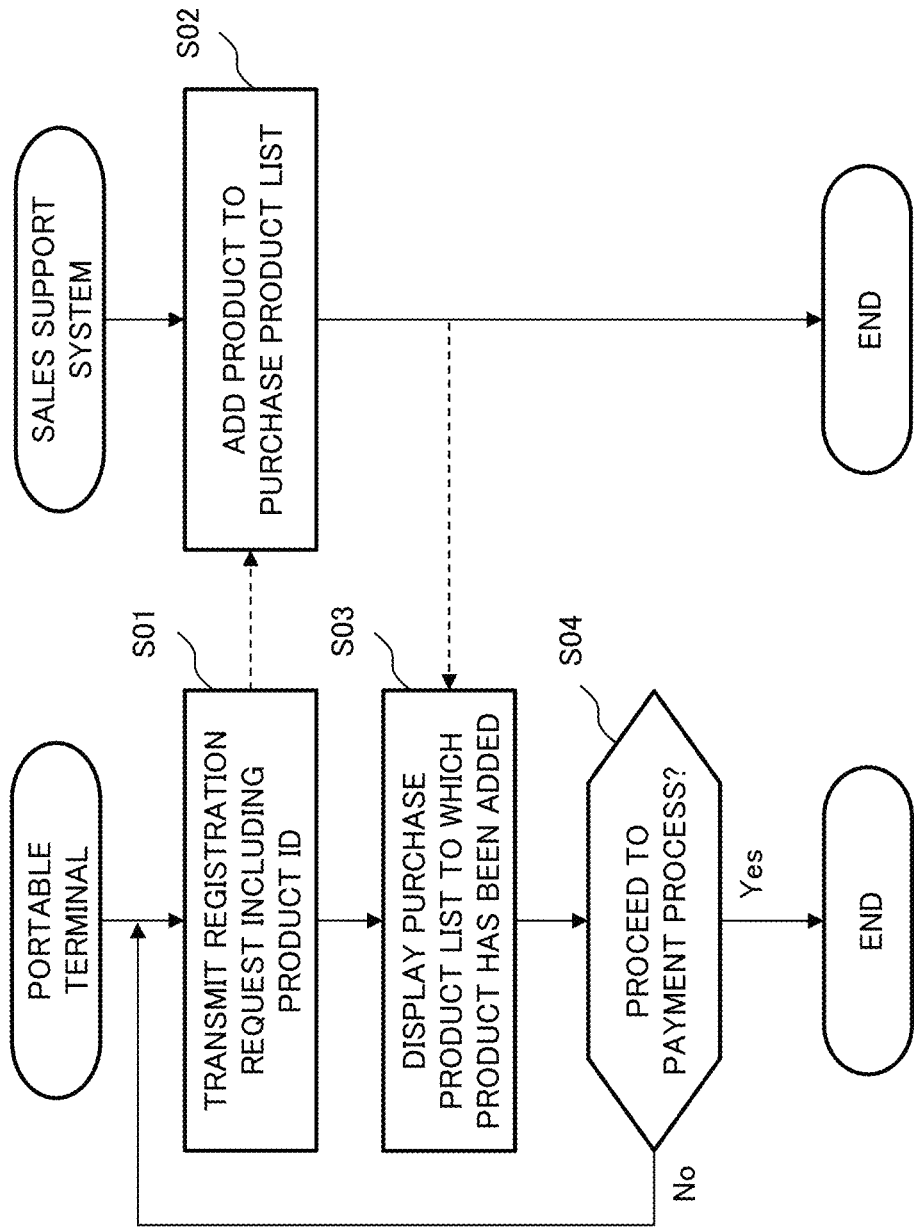
FIG. 3 is a flowchart illustrating an example of a registration process.

FIG. 3 is a flowchart illustrating an example of a registration process. The acquisition unit 121 of the portable terminal 12 acquires a product ID of a purchased product by reading a product code attached to the product or the like. The output unit 122 causes the portable terminal 12 to transmit a registration request including the product ID to the sales support system 11 (step S01). In addition to the product ID, the registration request may include a customer ID and an ID of the portable terminal 12.

Figure 4:
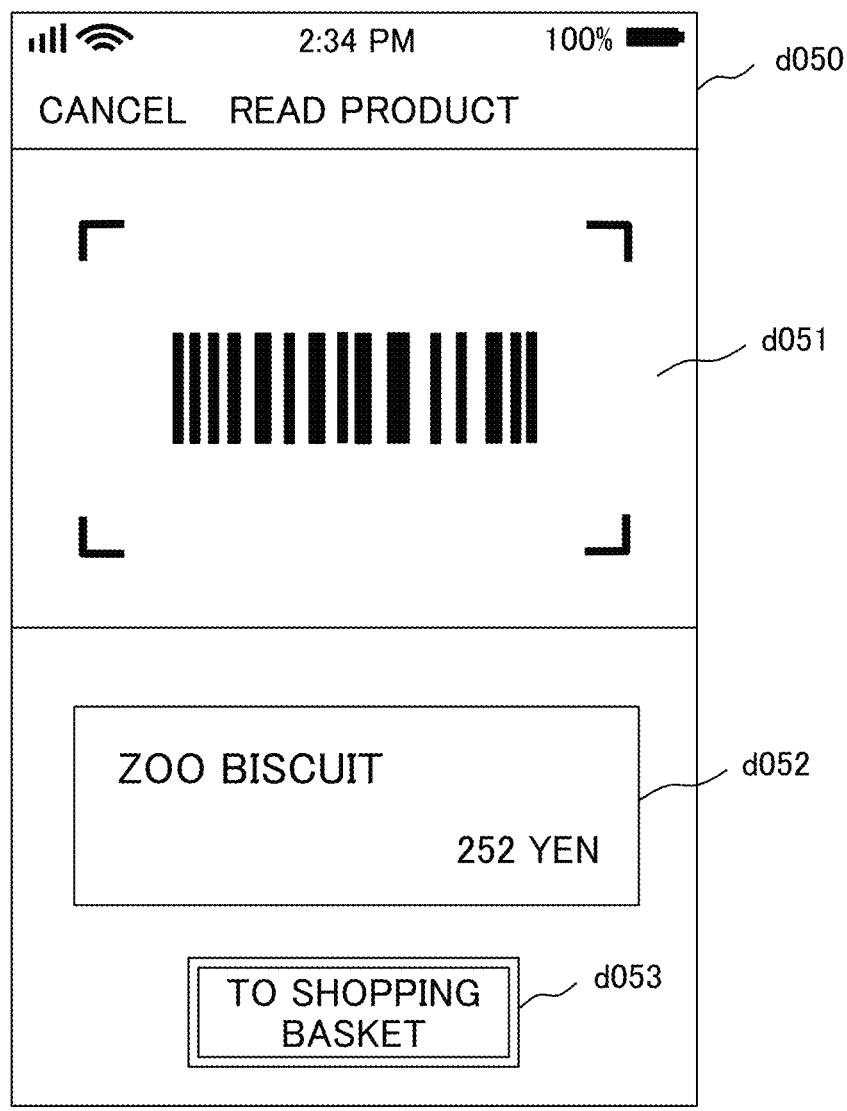
FIG. 4 is a diagram illustrating an example of a product registration screen.

FIG. 4 is a diagram illustrating an example of a product registration screen for reading a product code. The display unit 1230 of the portable terminal 12 displays a screen d050 for reading the product code. For example, the screen d050 includes a reading portion d051, a display field d052 for displaying information regarding a read product, and a button d053 for displaying "To shopping basket" for displaying a purchase product list. When the product code of the imaged product is located in a predetermined area of the reading portion d051, the acquisition unit 121 acquires the product ID of the purchased product. The sales support system 11 may transmit the product information of the product of which a product ID has been acquired to the portable terminal 12 with reference to the product DB 115. In this case, the portable terminal 12 displays the received product information. For example, in FIG. 4, in the display field d052, "ZOO biscuit" which is a name of the product and 252 yen which is a price of the product are displayed among the product information received by the portable terminal 12.

Figure 5:
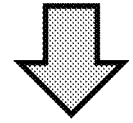
FIG. 5 is a diagram illustrating an example of product information stored in a product DB 115.

Referring back to FIG. 3, the list generation unit 101 of the sales support system 11 adds the product included in the registration request to the purchase product list of the customer (step S02). FIG. 5 is a diagram illustrating an example of the product information stored in the product DB 115 referred to by the list generation unit 101. FIG. 5 illustrates the "ZOO biscuit" of which a price is 252 yen at 14:34. The list generation unit 101 adds data of a product name "ZOO biscuit", a price of "252 yen", and a quantity "1 item" to a purchase product list of a predetermined customer ID.

The list generation unit 101 transmits the purchase product list to which a product has been added to the portable terminal 12. The portable terminal 12 displays the purchase product list to which the product has been added (step S03).

Figure 6:
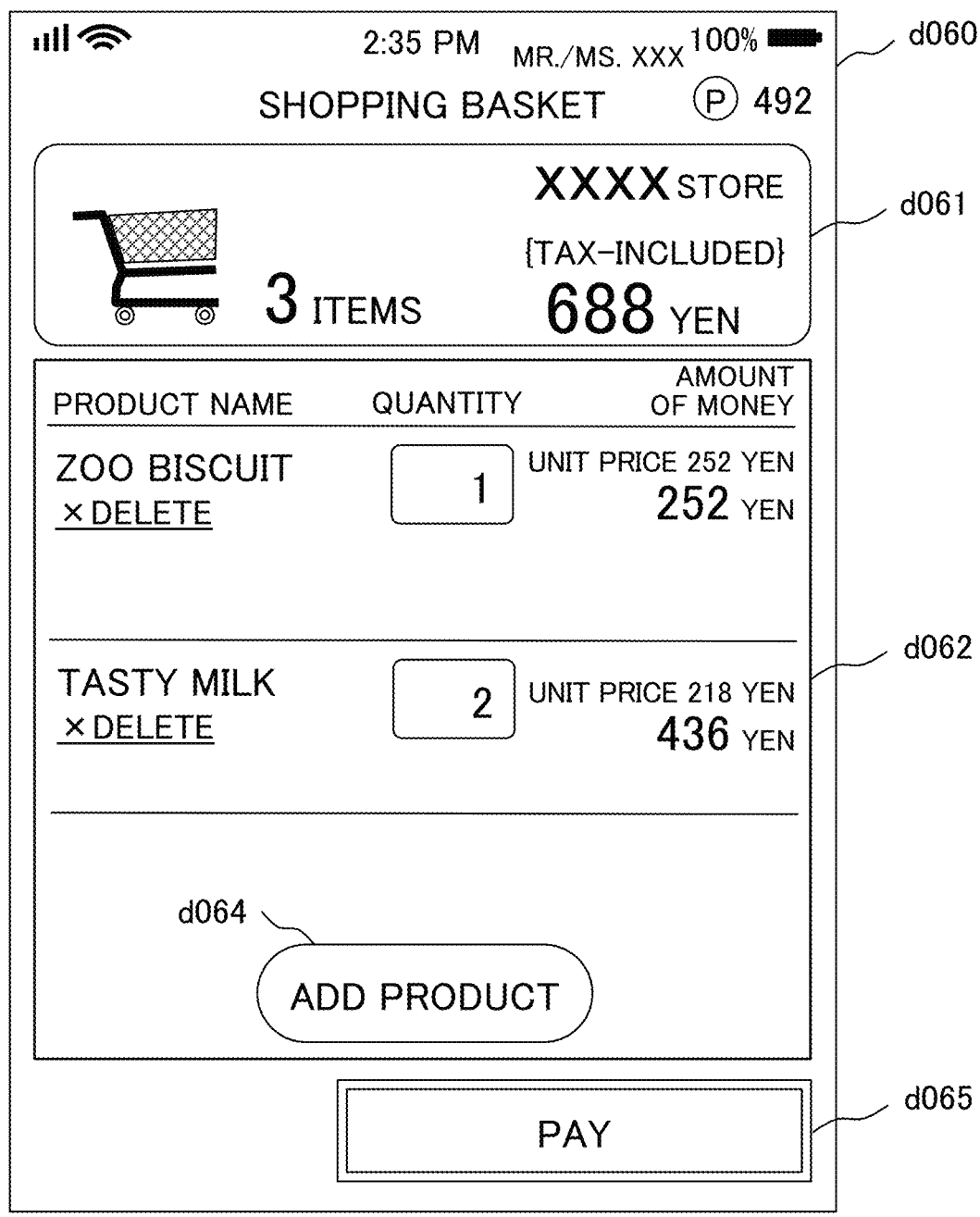
FIG. 6 is a diagram illustrating an example of a screen of a purchase product list.

FIG. 6 is a diagram illustrating an example of a screen of a purchase product list displayed on the portable terminal 12. A screen d060 includes, for example, a summary field d061 of the purchase product list, a detail field d062, a product addition button d064, and a payment button d065.

When the customer does not end the product registration (No in step S04), the sales support system 11 and the portable terminal 12 repeat the processes of steps S01 to S03. For example, when the product addition button d064 is pressed on the screen of FIG. 6, the portable terminal 12 displays the product registration screen of FIG. 4 and acquires the product ID.

When payment is performed, the portable terminal 12 ends the registration process and causes the process to proceed to the adjustment process (Yes in step S04). For example, when the payment button d065 is pressed on the screen of FIG. 6, the portable terminal 12 terminates the product registration.

2. Updating Price

Figure 7:
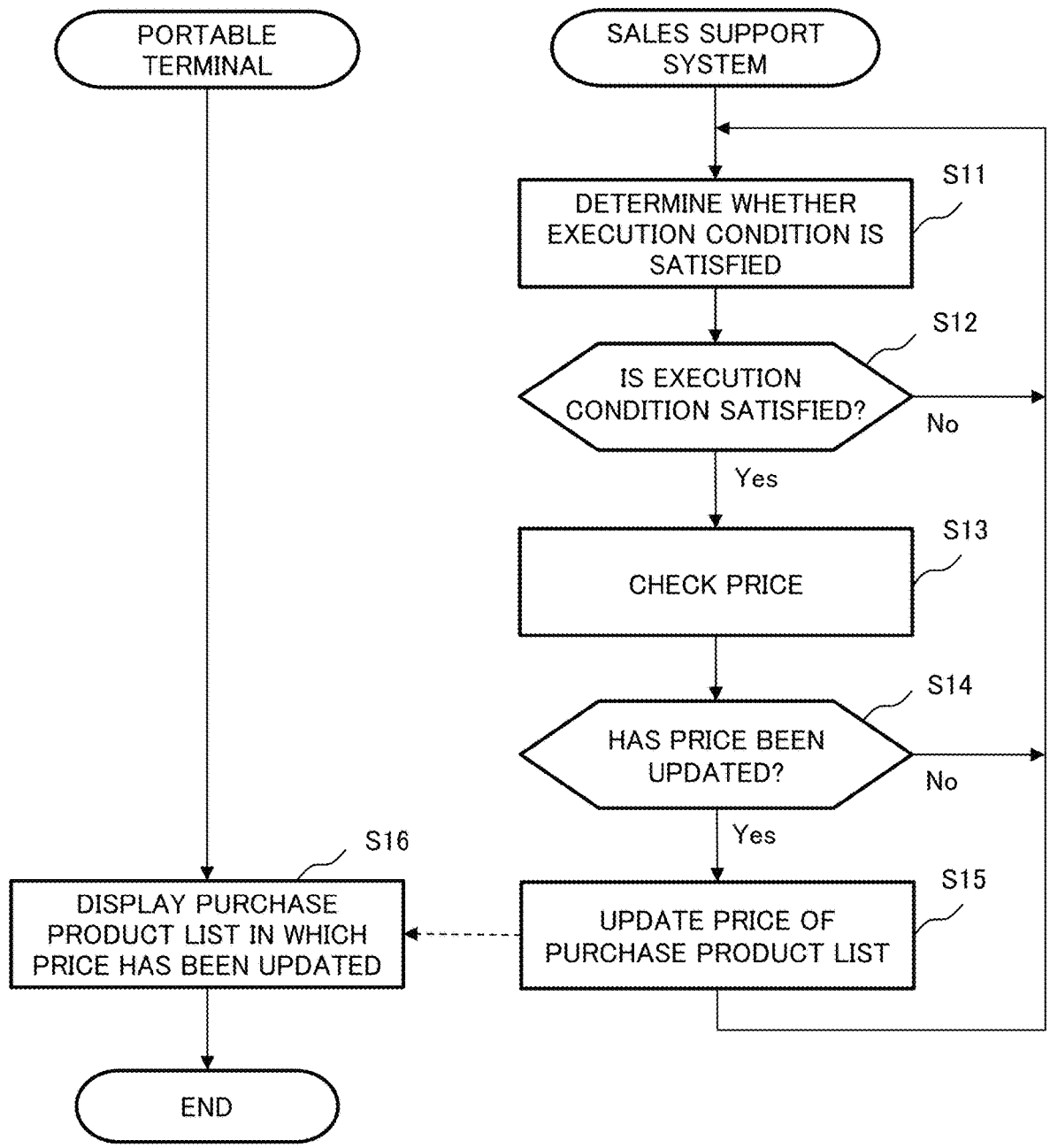
FIG. 7 is a flowchart illustrating an example of a price updating process.

FIG. 7 is a flowchart illustrating an example of the price updating process. The price updating unit 102 determines whether the execution condition of the price updating process is satisfied at any timing (step S11). The price updating unit 102 may execute the determination in step S11 at predetermined time intervals while the registration process in FIG. 3 is being executed.

When the execution condition is satisfied (Yes in step S12), the price updating unit 102 executes the price updating process. Specifically, the price updating unit 102 checks the price in the product DB 115 (step S13). Hereinafter, a case where a product is further added to the purchase product list of FIG. 6 will be described as an example. When the price updating unit 102 refers to the product DB 115 of FIG. 5 at 3:00 PM, it is determined in FIG. 6 that the set price of the registered "ZOO biscuit" does not match the price registered in the purchase product list.

When the set price has been changed (Yes in step S14), the price updating unit 102 updates the price of the registered product included in the purchase product list to the new set price indicated by the product DB 115 (step S15). In FIG. 5, since the price has been changed, the price updating unit 102 updates the price of the "ZOO biscuit" on the purchase product list of the customer to 240 yen.

The price updating unit 102 transmits the purchase product list in which the price of the registered product has been updated to the portable terminal 12. The price updating unit 102 thus ends the price updating process.

The portable terminal 12 displays the purchase product list in which the price of the registered product has been updated (step S16).

In the flowchart of FIG. 7, in the case of No in step S12, the price updating unit 102 does not execute the price updating process. In the case of No in step S14, the price updating unit 102 ends the price updating process without updating the price.

Figure 8:
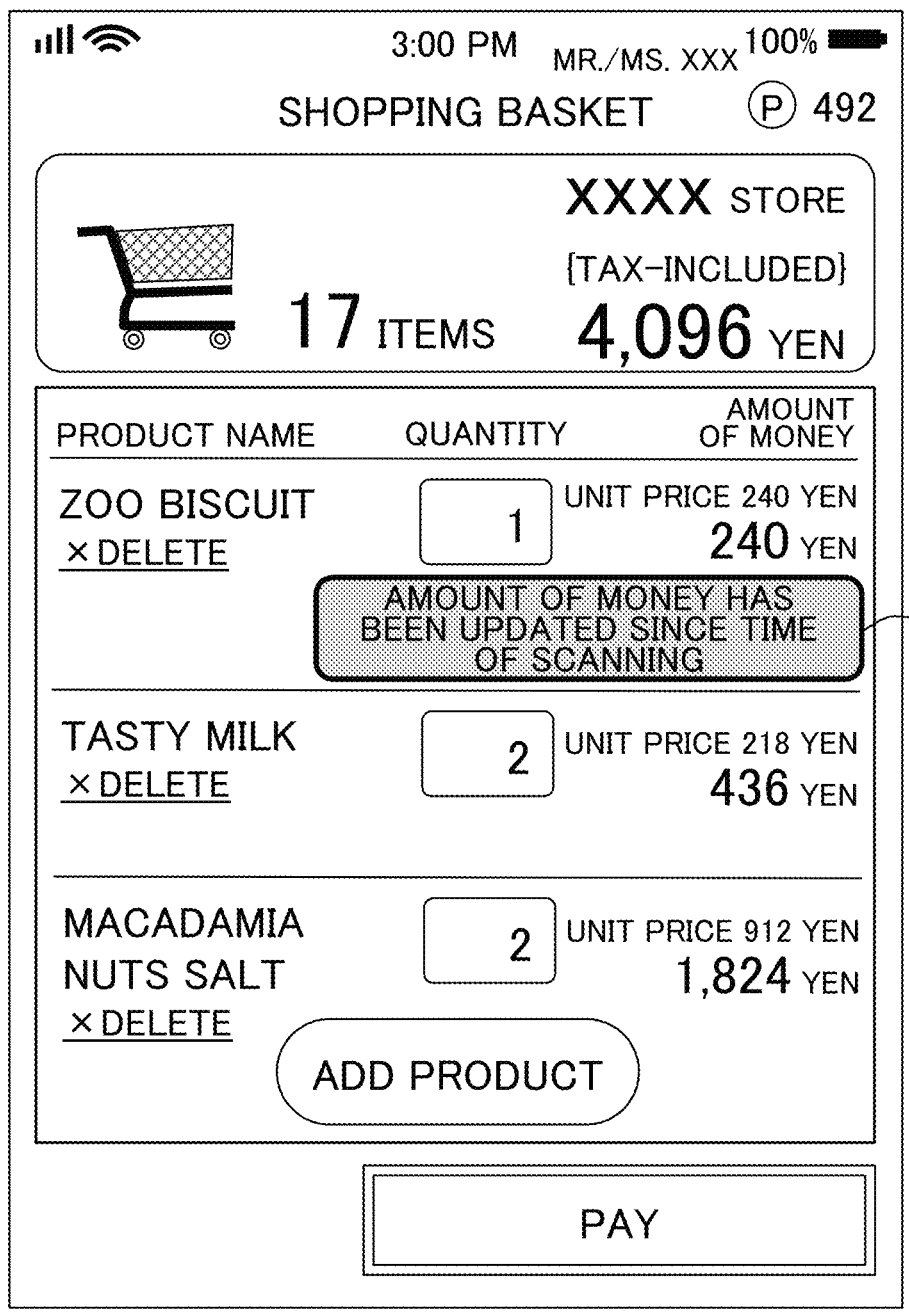
FIG. 8 is a diagram illustrating an example of a screen of a purchase product list of which a price has been updated.

FIG. 8 is a diagram illustrating an example of a screen of a purchase product list of which a price has been updated. In FIG. 8, the price of the "ZOO biscuit" has been updated from 252 yen to 240 yen after FIG. 6.

The price updating unit 102 may cause the portable terminal 12 to display a notification indicating that the price has been updated. d063 in FIG. 8 is an example of the notification indicating that the price has been updated. The notification d063 displays a message "Amount of money has been updated since time of scanning" in association with the product of which the price has been updated. However, an example of the notification is not limited thereto. The notification may include at least one of a product name of the product of which the price has been updated, the price before the updating, and the amount of change in the price. The notification may be displayed in a different display form such as color or blinking depending on whether the price has increased or decreased due to the updating.

A display position of the notification is not limited to the position associated with the product, and may be displayed, for example, in the summary field d061 of the purchase product list in FIG. 6. The notification may be pop-up displayed on any of the product registration screen, the display screen of the purchase product list, and the payment screen.

The price updating unit 102 may cause the portable terminal 12 to display a list of products of which the prices have been updated. The list may include at least one of a product name of each product of which a price has been updated, a price of each product before updating or a change amount of the price, and a sum of the change amounts.

The price updating unit 102 may repeat the processes of steps S11 to S15 whenever the execution condition is satisfied. Alternatively, the price updating unit 102 may perform the process of step S15 once and then end the process. For example, the price updating unit 102 may be configured to perform the processes of steps S11 to S16 only once before the customer performs payment. In the case of No in step S12 and No in step S14, the sales support system may end the process.

3. Adjustment

FIG. 9A is a flowchart illustrating an example of an adjustment process. When the registration process is completed, the adjustment process is started. For example, in the portable terminal 12, the adjustment process may be started when a button is pressed to proceed to the payment process such as the payment button d065 in FIG. 6.

When the adjustment process is started, the portable terminal 12 transmits an adjustment request to the sales support system 11 (step S21). The adjustment information generation unit 103 generates adjustment information based on the adjustment request (step S22), and transmits the adjustment information to the portable terminal 12. The adjustment information includes, for example, a total payment amount of the registered products. The portable terminal 12 displays a payment screen (step S23). The payment screen may display a total quantity of registered products, a total payment amount of the registered products, and the like. The payment screen may display a settlement process execution button. The portable terminal 12 communicates with a settlement server (not illustrated) using settlement information such as a credit card, a debit card, or electronic money and executes the settlement process (step S24). The portable terminal 12 transmits completion of the settlement process to the sales support system 11. When completion of the settlement process is received, the adjustment information generation unit 103 updates the sales DB 119 (step S25).

The operation examples of the sales support system 11 and the portable terminal 12 according to the first example embodiment have been described above.

According to an example embodiment, the price updating unit 102 updates a price of a registered product registered using the portable terminal 12 through an operation of a customer included in a purchase product list. When an execution condition of a price updating process is satisfied, the price updating unit 102 determines whether a price in the product DB 115 that stores a product and the price of the product in association has been changed. Accordingly, when the price of the product is changed, a price of the registered product registered using the portable terminal 12 can be updated through an operation of the customer.

According to an example embodiment, the price updating unit 102 transmits the purchase product list in which the price of the registered product has been updated to the portable terminal 12, and the portable terminal 12 displays the updated purchase product list. Accordingly, the customer can check the updated price.

According to an example embodiment, the adjustment information generation unit 103 generates the adjustment information based on the updated purchase product list. Accordingly, the customer and the store can perform adjustment based on the updated price.

(Modification: Using Adjustment Device)

In the above operation example, the case where the adjustment is performed using the portable terminal 12 has been described, but the adjustment may be performed in accordance with any method. For example, the adjustment may be performed using an adjustment device (not illustrated) instead of the portable terminal 12. The sales support system 11 transmits adjustment information to the adjustment device. The adjustment device executes a settlement process in accordance with any method such as cash settlement or cashless settlement based on the adjustment information.

The customer inputs an adjustment code which is information for specifying the adjustment information, to the adjustment device. The adjustment code includes, but is not limited to, an identifier of a purchase product list or an identifier of the portable terminal 12. The adjustment code may be adjustment information. In order to input the adjustment code to the adjustment device, another recording medium such as the portable terminal 12 or a member card may be used.

Figure 9B:
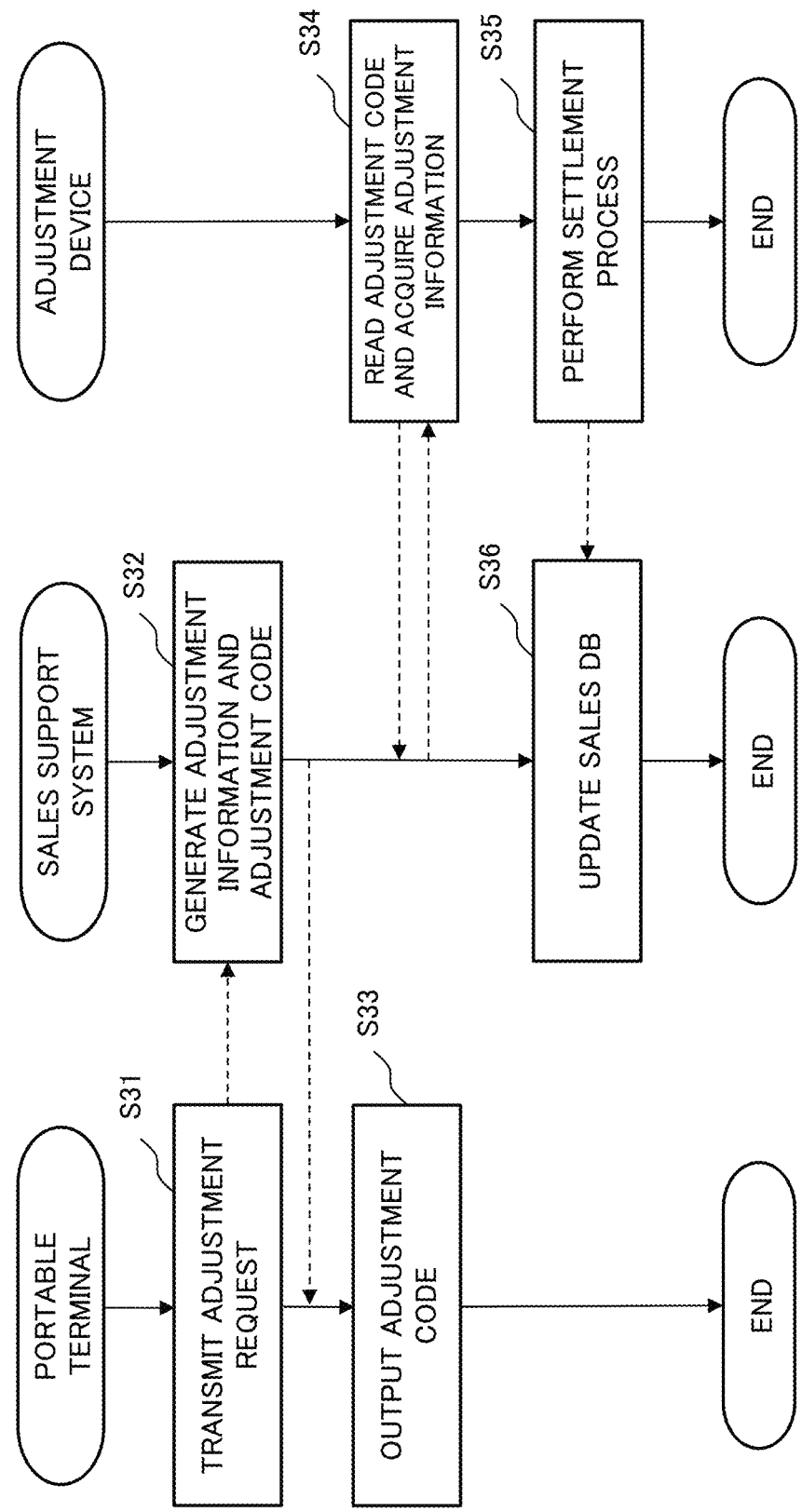
FIG. 9B is a flowchart illustrating another example of the adjustment process.

FIG. 9B is a flowchart illustrating another example of the adjustment process. As in the above-described step S21, the portable terminal 12 transmits an adjustment request to the sales support system 11 (step S31). The adjustment information generation unit 103 generates adjustment information and an adjustment code based on the adjustment request from the portable terminal 12 (step S32).

The adjustment information generation unit 103 outputs the adjustment code to the portable terminal 12. The portable terminal 12 outputs the adjustment code and causes the adjustment device to read the adjustment code (step S33). A method of causing the adjustment device to read the adjustment code is not particularly limited. For example, the display unit 1230 may display a barcode obtained by encoding an adjustment code or a two-dimensional code. Alternatively, the output unit 122 may communicate with the adjustment device and cause the adjustment device to read the code. Specifically, the output unit 122 may transmit the adjustment code to the adjustment device through wireless communication such as near field communication (NFC), Wi-Fi (registered trademark), or Bluetooth (registered trademark).

The adjustment device reads the adjustment code and acquires the adjustment information related to the adjustment code from the sales support system 11 (step S34). The adjustment device executes a settlement process based on the acquired adjustment information (step S35), and the sales support system 11 updates the sales DB 119 when a completion of the settlement process is received (step S36).

The portable terminal 12 may transmit an adjustment request to the sales support system 11 at a time point at which the adjustment code is read by the adjustment device. The sales support system 11 may not generate the adjustment code. When the adjustment code is stored in the portable terminal 12 or another recording medium, the adjustment device reads the stored adjustment code using any reader.

In FIG. 9B, the case where the portable terminal 12 transmits the adjustment request has been described. However, the adjustment request may be transmitted by the adjustment device. For example, when the adjustment code is input, the adjustment device transmits an adjustment request to sales support system 11.

Figure 9C:
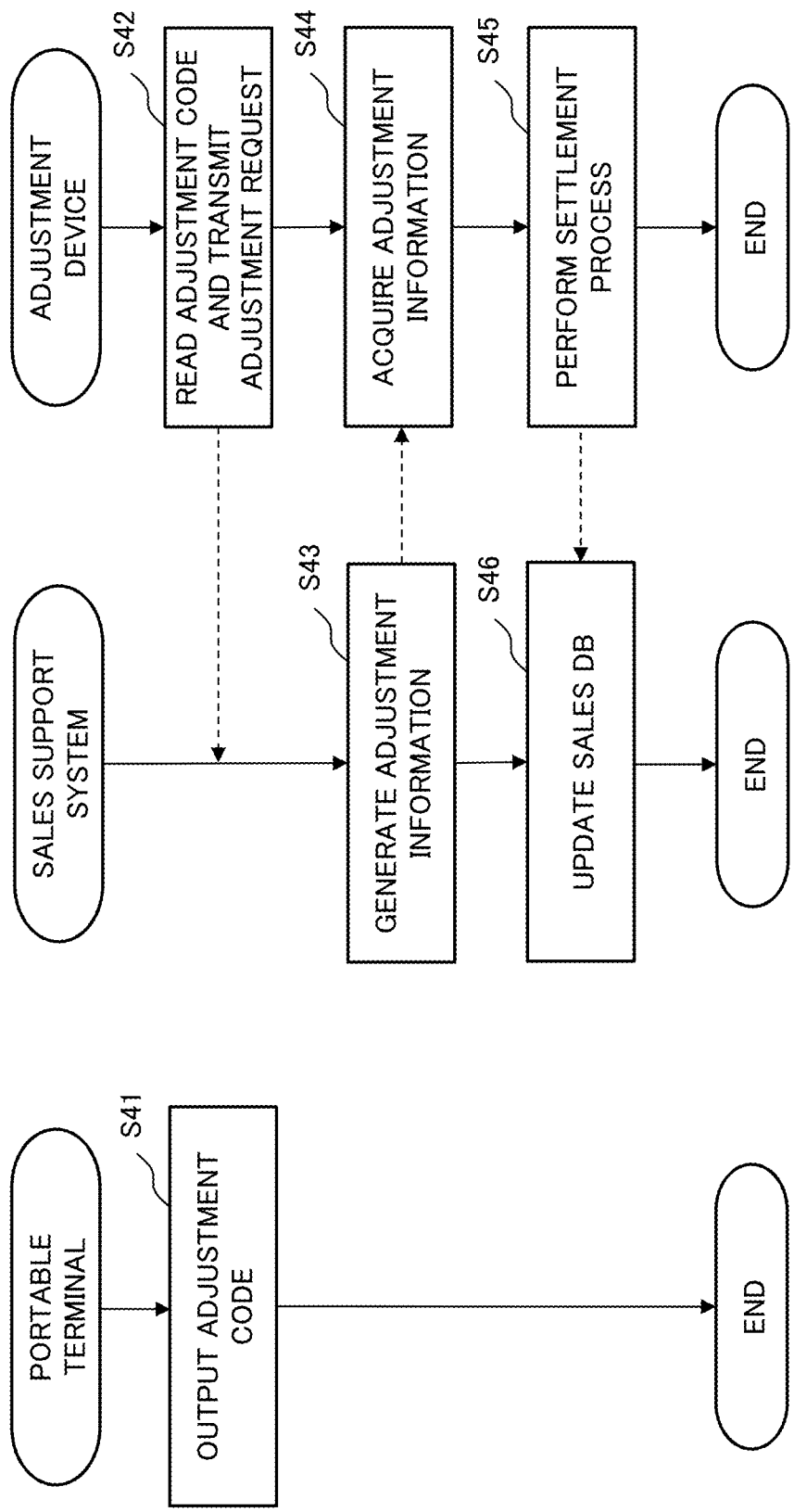
FIG. 9C is a flowchart illustrating still another example of the adjustment process.

FIG. 9C is a flowchart illustrating another example of the adjustment process. The adjustment process of FIG. 9C may be started when an adjustment code is input to the adjustment device. First, the portable terminal 12 outputs the adjustment code (step S41). This adjustment code may be stored in advance in the portable terminal 12. Alternatively, the adjustment code may be transmitted from the sales support system 11 based on a request in response to an input of a button for starting an adjustment process in the portable terminal 12. In step S41, the portable terminal 12 may not be used by using another storage medium that stores the adjustment code.

The adjustment device reads the adjustment code and transmits an adjustment request to the sales support system 11 (step S42). The sales support system 11 generates adjustment information based on the adjustment request (step S43). The adjustment device acquires the generated adjustment information (step S44). Thereafter, the adjustment device executes a settlement process based on the adjustment information (step S45), and the sales support system 11 updates the sales DB 119 (step S46).

(Modification: Price Updating Button)

In the first example embodiment, the case where the execution condition of the price updating process is that a new product is registered has been described as an example. However, the execution condition is not limited thereto.

The execution condition may be, for example, that the price updating button is pressed in the portable terminal 12. The product registration screen or the display screen of the purchase product list displayed by the portable terminal 12 may include a price updating button.

Figure 10:
FIG. 10 is a diagram illustrating an example of a price updating button according to a modification.

FIG. 10 is a diagram illustrating an example of the price updating button included in the display screen of the purchase product list. A description of "update: reflection of latest price" is displayed on a price updating button d066 in FIG. 10. When a customer presses the price updating button, the price updating unit 102 executes a price updating process and determines, for example, whether the price stored in the product DB 115 has been changed.

According to the configuration in which the price is updated by the price updating button, the sales support system 11 can present the updated price to the customer in response to the request of the customer.

(Modification: Passing of Predetermined Time)

Alternatively, the execution condition of the price updating process may be a time condition.

The time condition may be that a predetermined time has passed during the registration process. The passing of the predetermined time includes, for example, passing of the predetermined time from start of the registration process, or passing of the predetermined time after the price updating unit 102 determines reference or change in the price once. The predetermined time is arbitrarily determined, for example, within a range of 1 minute to 1 hour.

The time condition may include reaching of a predetermined time such as 1:00, 2:00, and 3:00.

When the time condition is satisfied, the price updating unit 102 executes the price updating process. Specifically, for example, when it is determined that the predetermined time has passed, the price updating unit 102 determines whether the set price stored in the product DB 115 has been changed. When the set price has been changed, the price updating unit 102 updates the price.

For example, the price updating unit 102 executes the price updating process at predetermined time intervals such as every 10 minutes or every 1 hour, in such a way that the process of determining whether the price of the purchase product list is updated can be automatically started.

(Modification: Updating Before Payment)

The execution condition of the price updating process may be, for example, that the product registration process in the portable terminal 12 is completed. Alternatively, the execution condition may be that the adjustment process for the registered product is started. Specifically, for example, when the payment button d065 is pressed on the screen of FIG. 6, the price updating unit 102 refers to the price.

The execution condition may be that an adjustment request is received from the portable terminal 12 or the adjustment device according to the modification. For example, when the adjustment request is received from the portable terminal 12 or the adjustment device, the price updating unit 102 refers to the set price.

Alternatively, the execution condition may be that the adjustment code is read by the adjustment device. For example, the price updating unit 102 receives that the adjustment code is read from the portable terminal 12 or the adjustment device to refer to the price.

When the price updating unit 102 updates the price, the adjustment information generation unit 103 generates the adjustment information based on the updated price. The price of the registered product is paid with the portable terminal 12 or the adjustment device using the generated adjustment information. A notification indicating that the price has been updated may be displayed on the screen related to payment of the portable terminal 12 or the adjustment device.

For example, when the product registration process is completed or when the adjustment process is started, the price updating unit 102 can update the price of the purchase product list before payment by the customer by checking the price before the payment.

(Modification: Discount of Product)

The price of the product in the product DB 115 may include discount information regarding a discount of the price of the product. The discount information includes a discount amount from the price before the discount of the product or discount at a predetermined rate. The discount information includes, for example, at least one of classified discount information, bundle discount information, set discount information, and total amount discount information, but is not limited thereto.

The classified discount information is information regarding discount of a product belonging to specific classification (for example, frozen food or the like). For example, classification information indicating classification that is a discount target and a discount amount are associated with each other. The bundle discount information is information regarding a discount allowed when a plurality of specific products is purchased. For example, products (specifically, product IDs) to be discounted, the number of products, and a discount amount are associated with each other. The set discount information is information regarding a discount of a specific combination of products. For example, a combination of products to be discounted and a discount rate are associated with each other. The total amount discount information is information regarding a discount offered when the total amount of the purchased products is equal to or more than a predetermined amount of money. For example, the total amount to be discounted and the discount rate are associated with each other.

The list generation unit 101 reflects the discount in the purchase product list with reference to the discount information in the product DB 115. When the execution condition of the price updating process is satisfied, the price updating unit 102 also updates the price of the registered product with reference to the discount information in the product DB 115.

The execution condition may be that the discount information stored in the product DB 115 has been changed. The price updating unit 102 applies the discount to the registered product in the purchase product list based on the changed discount information. A case where the discount applied once is not applied due to a change in the discount information is also assumed.

When the discount information is changed, the price updating unit 102 executes the price updating process, in such a way that the discount can be applied to the registered product based on the new discount information.

(Modification: Change in Price in Product DB 115)

The execution condition of the price updating process may be that the price of the product stored in the product DB 115 has been changed. A case where the price of the product is changed due to the change in the discount information includes a case where the price of the product is changed.

The price updating unit 102 may determine whether the price of the product DB 115 has been changed. Specifically, for example, the product DB 115 stores a time at which the price has been changed. The price updating unit 102 may determine whether the time is later than a time when the previous price determination is performed with reference to the time when the price is changed. When the time at which the price is changed is later than the time of the previous determination, the price updating unit 102 refers to the price in the product DB 115. Alternatively, the price updating unit 102 may receive a notification indicating that the price of the product DB 115 has been changed from the storage unit 114. When the notification is received, the price updating unit 102 updates the price of the registered product with reference to the changed set price.

When the price of the product stored in the product DB 115 is changed, the price updating unit 102 can update the price of the registered product by executing the price updating process.

(Modification: Maintaining Price)

When a new set price stored in the product DB 115 is higher than the price registered in the purchase product list, the price updating unit 102 may not update the price of the product in the purchase product list. That is, the price updating unit 102 may update the price of the product of which the new set price stored in the product DB 115 is lower than the price of the registered product included in the purchase product list. In this case, the price updating unit 102 may include a determination unit that determines the presence or absence of a product of which a price rises due to the updating of the price. The determination unit is an example of a determination means.

The price updating unit 102 stops updating the price of the product of which the price is determined to rise, and maintains the price indicated in the purchase product list.

When the price rises, the price updating unit 102 maintains the price, and thus it is possible to prevent a disadvantage to the customer.

Second Example Embodiment

Next, a sales support system 11 according to a second example embodiment will be described. In the sales support system 11 according to a second example embodiment, the basic configuration of the first example embodiment will be described.

Figure 11:
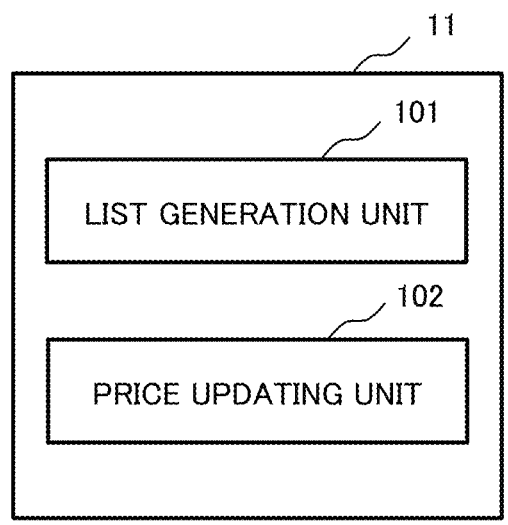
FIG. 11 is a block diagram illustrating a configuration of a sales support system 11 according to a second example embodiment.

FIG. 11 is a block diagram illustrating a configuration of the sales support system 11 according to the second example embodiment. The sales support system 11 according to the second example embodiment includes a list generation unit 101 and a price updating unit 102.

The sales support system 11 is connected to a server that has the functions of the adjustment information generation unit 103 and the storage unit 114 according to the first example embodiment via a network. The sales support system 11 communicates with a portable terminal operated by a customer through a network. The sales support system 11 according to the second example embodiment may include some or all of the functions of the sales support system 11 according to the first example embodiment.

The list generation unit 101 generates a purchase product list including products registered using the portable terminal through an operation of the customer and prices based on the set price referred to in registration of the product. The set prices are stored, for example, in a storage unit (not illustrated) in association with information for identifying the products. The stored set prices may be changed during the product registration by the customer.

When the execution condition of the price updating process is satisfied, the price updating unit 102 updates the price of the registered product included in the purchase product list to a new set price.

In the second example embodiment, as in the first example embodiment, the price updating unit 102 may determine whether the set price stored in the storage unit has been changed with reference to the storage unit. Alternatively, the price updating unit 102 may receive a notification indicating that the set price has been changed from another functional unit. The price updating unit 102 may receive the changed set price from another functional unit. The price updating unit 102 may update the price of the purchase product list with reference to the received set price.

A plurality of execution conditions may be provided. In this case, the price updating unit 102 updates the price of the purchase product list when any of the plurality of execution conditions is satisfied and the set price is changed.

The generated and updated purchase product list is used to generate adjustment information. The adjustment method is arbitrarily determined.

Figure 12:
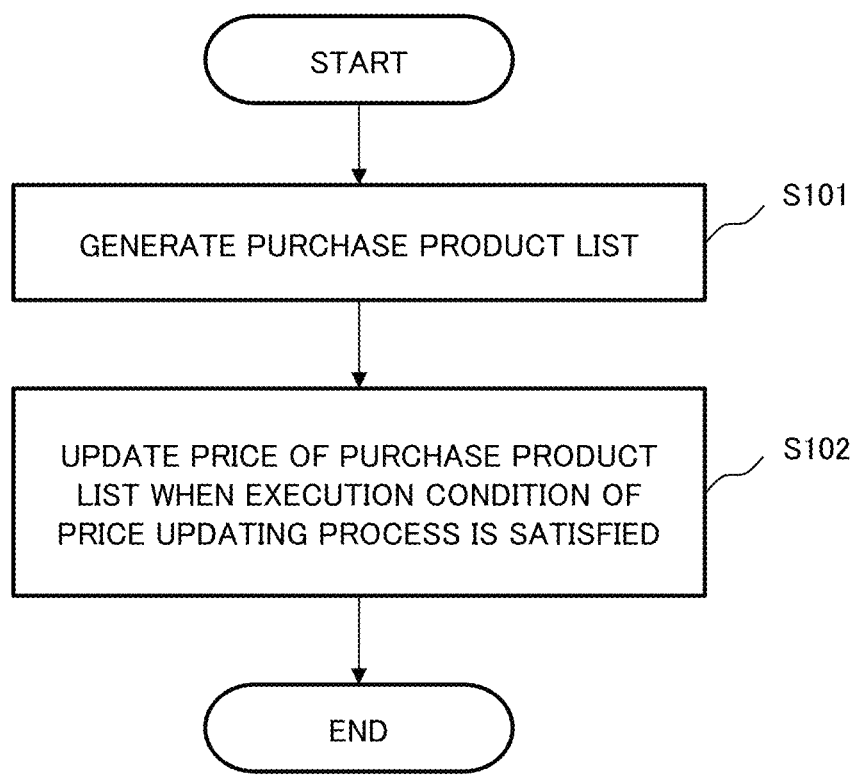
FIG. 12 is a flowchart illustrating an operation example of a sales support system 11 according to the second example embodiment.

FIG. 12 is a flowchart illustrating an operation example of the sales support system 11 according to the second example embodiment. The list generation unit 101 generates a purchase product list including a product registered using the portable terminal through an operation of a customer and a set price referred to in registration of the product (step S101).

When the set price is changed, the price updating unit 102 updates the price of the registered product included in the purchase product list on condition that the execution condition is satisfied (step S102).

According to one example embodiment, when the set price is changed, the price updating unit 102 updates the price of the registered product included in the purchase product list on condition that the execution condition is satisfied. Accordingly, when the price of the product is changed, the price of the registered product registered using the portable terminal through the operation of the customer can be updated.

[Hardware Configuration]

In each of the above-described example embodiments, each constituent of the sales support system 11 indicates a functional unit block. Some or all of the constituents of each device may be implemented in any combination of a computer 500 and a program.

Figure 13:
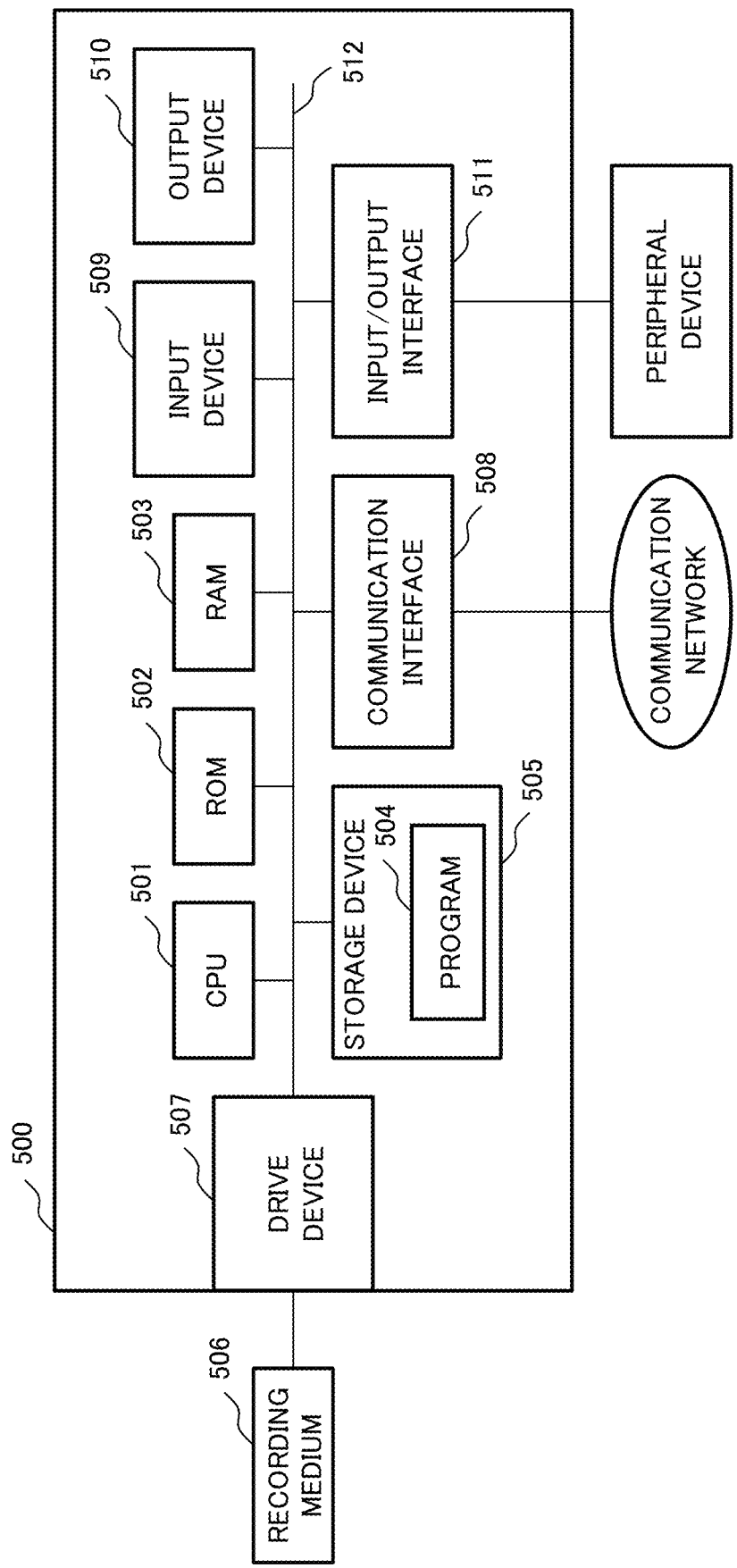
FIG. 13 is a block diagram illustrating an example of a hardware configuration of a computer 500.

FIG. 13 is a block diagram illustrating an example of a hardware configuration of the computer 500. Referring to FIG. 13, the computer 500 includes, for example, a central processing unit (CPU) 501, a read-only memory (ROM) 502, a random access memory (RAM) 503, a program 504, a storage device 505, a drive device 507, a communication interface 508, an input device 509, an input/output interface 511, and a bus 512.

The program 504 includes instructions to implement each function of each device. The program 504 is stored in advance in the ROM 502, the RAM 503, or the storage device 505. The CPU 501 implements each function of each device by executing the instructions included in the program 504. For example, CPU 501 of the sales support system 11 implements the function of sales support system 11 by executing a command included in program 504. The RAM 503 may store data to be processed in each function of each device. For example, product information or a purchase product list may be stored in the RAM 503 of the computer 500.

The drive device 507 executes reading and writing from and on a recording medium 506. The communication interface 508 provides an interface with a communication network. The input device 509 is, for example, a mouse, a keyboard, or the like, and receives an input of information from a store manager or the like. The output device 510 is, for example, a display and outputs (displays) information to the store manager or the like. The input/output interface 511 provides an interface with a peripheral device. The bus 512 connects the constituents of the hardware to each other. The program 504 may be supplied to the CPU 501 via a communication network or may be stored in the recording medium 506 in advance, read by the drive device 507, and supplied to the CPU 501.

The hardware configuration illustrated in FIG. 13 is exemplary, and other constituents may be added or some constituents may not be included.

There are various modifications of a method of implementing each device. For example, for each constituent, each device may be implemented in any combination of a different computer and a different program. A plurality of constituent units included in each device may be implemented in any combination of one computer and a program.

Some or all of the constituents of each device may be implemented by general-purpose or dedicated circuitry including a processor or the like, or a combination thereof. These circuits may be configured with a single chip or may be configured with a plurality of chips connected via a bus. Some or all of the constituents of each device may be implemented in a combination of the above-described circuit or the like and a program.

When some or all of the constituents of each device are implemented by a plurality of computers, circuits, and the like, the plurality of computers, circuits, and the like may be centralized or distributed.

At least a part of the sales support system 11 may be provided in a software as a service (SaaS) format. That is, at least some of the functions of implementing the sales support system 11 may be executed by software executed via a network.

Although the example embodiments of the present disclosure have been described above, the present disclosure is not limited to the example embodiments. For the configurations or the details of the present disclosure, various modifications that can be understood by those skilled in the art can be made within the scope of the present disclosure. The configurations in the example embodiments can be combined with each other without departing from the scope of the present disclosure.

Some or all of the above example embodiments can be described as the following supplementary notes, but are not limited to the following.

[Supplementary Note 1]
A sales support system including
  a list generation means that generates a purchase product list including a product registered using a portable terminal through an operation of a customer and a price based on a set price referred to for registration of the product, and
  an updating means that updates a price of a registered product included in the purchase product list to a new set price when an execution condition of a price updating process is satisfied.

[Supplementary Note 2]
The sales support system according to Supplementary Note 1, in which
  the updating means transmits the purchase product list in which the price of the registered product is updated to the portable terminal.

[Supplementary Note 3]
The sales support system according to Supplementary Note 1 or 2, further including
  an adjustment information generation means that generates adjustment information based on the updated purchase product list.

[Supplementary Note 4]
The sales support system according to any one of Supplementary Notes 1 to 3, in which
  the updating means causes the portable terminal to display a notification indicating that the price of the registered product has been updated.

[Supplementary Note 5]
The sales support system according to any one of Supplementary Notes 1 to 4, in which
  the execution condition includes registration of one or more products using the portable terminal.

[Supplementary Note 6]
The sales support system according to any one of Supplementary Notes 1 to 5, in which
  the execution condition includes completion of a product registration process in the portable terminal.

[Supplementary Note 7]
The sales support system according to any one of Supplementary Notes 1 to 5, in which
  the execution condition includes start of an adjustment process for the registered product.

[Supplementary Note 8]
The sales support system according to any one of Supplementary Notes 1 to 7, in which
  the execution condition includes a price updating button having been pressed on the portable terminal.

[Supplementary Note 9]
The sales support system according to any one of Supplementary Notes 1 to 8, in which
  the execution condition includes a time condition.

[Supplementary Note 10]
The sales support system according to any one of Supplementary Notes 1 to 9, in which
  the execution condition includes a change in the set price.

[Supplementary Note 11]
The sales support system according to any one of Supplementary Notes 1 to 10, in which
  the updating means further determines whether the execution condition is satisfied.

[Supplementary Note 12]
The sales support system according to any one of Supplementary Notes 1 to 11, in which
  the updating means checks the set price to update the price of the registered product included in the purchase product list when the execution condition is satisfied.

[Supplementary Note 13]
The sales support system according to Supplementary Note 12, in which
  the updating means checks whether the set price has been changed, and updates the price of the registered product when the set price has been changed.

[Supplementary Note 14]
The sales support system according to any one of Supplementary Notes 1 to 13, further including
  a determination means that determines presence or absence of the registered product of which a new set price is higher than a price of the registered product, in which
  the updating means stops updating in which the price of the registered product rises.

[Supplementary Note 15]
A sales support method including
  generating a purchase product list including a product registered using a portable terminal through an operation of a customer and a price based on a set price referred to for registration of the product, and
  updating a price of a registered product included in the purchase product list to a new set price when an execution condition of a price updating process is satisfied.

[Supplementary Note 16]
A recording medium that non-transiently records a sales support program causing a computer to execute a process of generating a purchase product list including a product registered using a portable terminal through an operation of a customer and a price based on a set price referred to for registration of the product, and a process of updating a price of a registered product included in the purchase product list to a new set price when an execution condition of a price updating process is satisfied.

REFERENCE SIGNS LIST

11 Sales support system
101 List generation unit
102 Price updating unit
103 Adjustment information generation unit
114 Storage unit
115 Product DB
116 Purchase product list DB
119 Sales DB
12 Portable terminal

What is claimed is:

1. A sales support system comprising:
at least one memory storing instructions; and
at least one processor configured to execute the instructions to:
for each of a plurality product codes attached to products that a customer intends to purchase,
display, on a portable terminal of the customer, a shopping basket user interface showing a first area including a purchase product list of product names of products that the customer intends to purchase and set prices of the products, a second area including a total price of the set prices of the products, a third area selectable by the customer on the portable terminal to add a new product to the purchase product list, and a fourth area selectable by the customer on the portable terminal to initiate performance of a payment process of the products;
in response to receiving, from the portable terminal, indication of user selection of the third area of the shopping basket user interface:
display, on the portable terminal, a read product user interface showing a first area of an image captured by the portable terminal in which a product code attached to the new product is included, and a second area selectable by the customer on the portable terminal to return to the shopping basket user interface;
retrieve a product name and a set price of the new product and add the new product to the purchase product list;
update the read product user interface displayed on the portable terminal to include a third area showing the product name and the set price of the new product;
in response to receiving, from the portable terminal, indication of user selection of the second area of the read product user interface, return to display of the shopping basket user interface;
in response to determining that an execution condition of a price updating process has been satisfied:
determine each product for which the set price has changed;
update the purchase product list by, for each product for which the set price has changed, updating the set price in the purchase product list;
update the shopping basket user interface displayed on the portable terminal based on the updated purchase product list, including in the first area, an indication of each product for which the set price has changed; and
in response to receiving, from the portable terminal, indication of user selection of the fourth area of the shopping basket user interface, perform the payment process of the products in the updated purchase product list.

2. The sales support system according to claim 1, wherein the execution condition includes addition of the new product to the purchase product list.

3. The sales support system according to claim 1, wherein the execution condition includes initiation of performance of the payment process.

4. The sales support system according to claim 1, wherein the execution condition includes initiation of an adjustment process for any product in the purchase product list.

5. The sales support system according to claim 1, wherein the execution condition includes user selection on the portable terminal of a price updating button displayed on the portable terminal.

6. The sales support system according to claim 1, wherein the execution condition includes a time condition.

7. The sales support system according to claim 1, wherein the execution condition includes a change in the price of any product in the purchase product list.

8. The sales support system according to claim 1, wherein the at least one processor is further configured to execute the instructions to:
update purchase product list by updating the set price in the purchase product list only for each product for which the set price has decreased and not for each product for which the set priced has increased.

9. A sales support method performed by a computer and comprising:
for each of a plurality product codes attached to products that a customer intends to purchase,
displaying, on a portable terminal of the customer, a shopping basket user interface showing a first area including a purchase product list of product names of products that the customer intends to purchase and set prices of the products, a second area including a total price of the set prices of the products, a third area selectable by the customer on the portable terminal to add a new product to the purchase product list, and a fourth area selectable by the customer on the portable terminal to initiate performance of a payment process of the products;
in response to receiving, from the portable terminal, indication of user selection of the third area of the shopping basket user interface:
displaying, on the portable terminal, a read product user interface showing a first area of an image captured by the portable terminal in which a product code attached to the new product is included, and a second area selectable by the customer on the portable terminal to return to the shopping basket user interface;
retrieving a product name and a set price of the new product and add the new product to the purchase product list;
updating the read product user interface displayed on the portable terminal to include a third area showing the product name and the set price of the new product;

in response to receiving, from the portable terminal, indication of user selection of the second area of the read product user interface, returning to display of the shopping basket user interface;

in response to determining that an execution condition of a price updating process has been satisfied:

determining each product for which the set price has changed;

updating the purchase product list by, for each product for which the set price has changed, updating the set price in the purchase product list;

updating the shopping basket user interface displayed on the portable terminal based on the updated purchase product list, including in the first area, an indication of each product for which the set price has changed; and in response to receiving, from the portable terminal, indication of user selection of the fourth area of the shopping basket user interface, performing the payment process of the products in the updated purchase product list.

10. A non-transitory recording medium storing a sales support program executable by a computer to perform processing comprising:

for each of a plurality product codes attached to products that a customer intends to purchase, displaying, on a portable terminal of the customer, a shopping basket user interface showing a first area including a purchase product list of product names of products that the customer intends to purchase and set prices of the products, a second area including a total price of the set prices of the products, a third area selectable by the customer on the portable terminal to add a new product to the purchase product list, and a fourth area selectable by the customer on the portable terminal to initiate performance of a payment process of the products;

in response to receiving, from the portable terminal, indication of user selection of the third area of the shopping basket user interface:

displaying, on the portable terminal, a read product user interface showing a first area of an image captured by the portable terminal in which a product code attached to the new product is included, and a second area selectable by the customer on the portable terminal to return to the shopping basket user interface;

retrieving a product name and a set price of the new product and add the new product to the purchase product list;

updating the read product user interface displayed on the portable terminal to include a third area showing the product name and the set price of the new product;

in response to receiving, from the portable terminal, indication of user selection of the second area of the read product user interface, returning to display of the shopping basket user interface;

in response to determining that an execution condition of a price updating process has been satisfied:

determining each product for which the set price has changed;

updating the purchase product list by, for each product for which the set price has changed, updating the set price in the purchase product list;

updating the shopping basket user interface displayed on the portable terminal based on the updated purchase product list, including in the first area, an indication of each product for which the set price has changed; and in response to receiving, from the portable terminal, indication of user selection of the fourth area of the shopping basket user interface, performing the payment process of the products in the updated purchase product list.

* * * * *